June 17, 1930.    J. C. MASEK    1,764,411
THEATER LIGHTING CONTROL APPARATUS
Filed June 18, 1927    8 Sheets-Sheet 1

Fig. 1.

WITNESSES:
R. J. Butler

INVENTOR
James C. Masek
BY
Wesley G. Carr
ATTORNEY

Fig. 2.

June 17, 1930.  J. C. MASEK  1,764,411
THEATER LIGHTING CONTROL APPARATUS
Filed June 18, 1927   8 Sheets-Sheet 5

WITNESSES:
R. J. Butler

INVENTOR
James C. Masek
BY
Wesley G. Carr
ATTORNEY

June 17, 1930.  J. C. MASEK  1,764,411
THEATER LIGHTING CONTROL APPARATUS
Filed June 18, 1927   8 Sheets-Sheet 6

INVENTOR
James C. Masek

Patented June 17, 1930

1,764,411

UNITED STATES PATENT OFFICE

JAMES C. MASEK, OF IRWIN, PENNSYLVANIA, ASSIGNOR TO WESTINGHOUSE ELECTRIC & MANUFACTURING COMPANY, A CORPORATION OF PENNSYLVANIA

THEATER-LIGHTING-CONTROL APPARATUS

Application filed June 18, 1927. Serial No. 199,702.

My invention relates to theater lighting control apparatus and particularly to theater switchboards of the multi-scene pre-set type wherein switches are provided that may be pre-set in advance of a performance in order to obtain desired lighting effects during any elected scene of the performance.

In the copending applications of Burt F. Fuller Serial Nos. 577,830, now Patent 1,640,542 and 651,658, filed July 27, 1922 and July 14, 1923, respectively and assigned to the Westinghouse Electric & Manufacturing Company, multi-scene pre-set switchboard apparatus is disclosed which produces the above noted results. In the apparatus disclosed in the above noted applications, movable bus bars are employed to energize the circuits during any selected scene.

It is an object of my invention to provide a theater switchboard wherein the selector or pre-settable switches are arranged conveniently in groups and wherein the scene switches are remotely located at another part of the board and disposed in a group for facilitating operation thereof. By concentrating the scene switches in a group adjacent the color master and main dimmer actuating levers, the operating handles that are frequently actuated during a performance are concentrated at a convenient point and are accessible to the operator without necessitating his movement from a point near the center of the board.

Another object of my invention is to provide a theater lighting switch board wherein color master switches are provided and which permit of independent energization of circuits of different color, thus rendering it possible during a scene of a performance to produce color combinations without necessitating changes in the pre-setting of the board. For instance, the red and blue circuits may be energized simultaneously to produce a purple effect or either one of the switches may be opened to produce a red or blue effect.

Another object of my invention is to provide a theater lighting switchboard having the above noted characteristics wherein drum switches are employed for controlling the main, color and scene circuits to conserve the space required for their installation and to reduce the overall dimensions of the switchboard. In a large theater, as many as 50 or more, separate lighting circuits are employed on the stage and auditorium, and since, in a ten scene switch, there are at least 10 or more conductors leading from the selector switches to the scene switches, it will be seen that provision must be made for accommodating a large number of switch contacts. The drum type switch thus further enables the concentration of the contact within a relatively small space.

Another object of my invention is to provide a theater switchboard wherein the switch and dimmer units are mounted upon a steel frame work in such manner that they may readily be detached for the purpose of investigation and repair, and wherein a deadfront switchboard is produced having detachable cover plates covering the various units of the apparatus and thus precluding access to live conductors from the front of the board.

These and other objects that will be made apparent throughout the further description of my invention are attained by means of the apparatus hereinafter described and illustrated in the accompanying drawings wherein:

Figure 11:
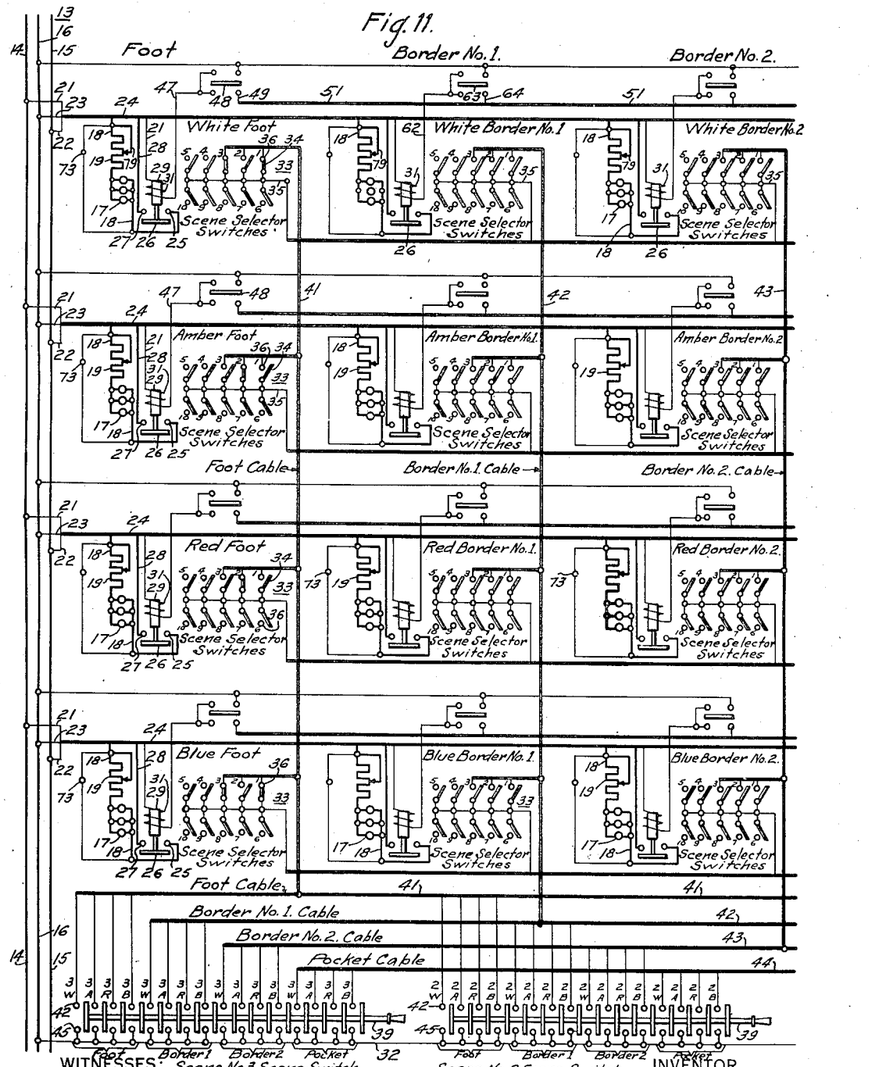
Figure 12:
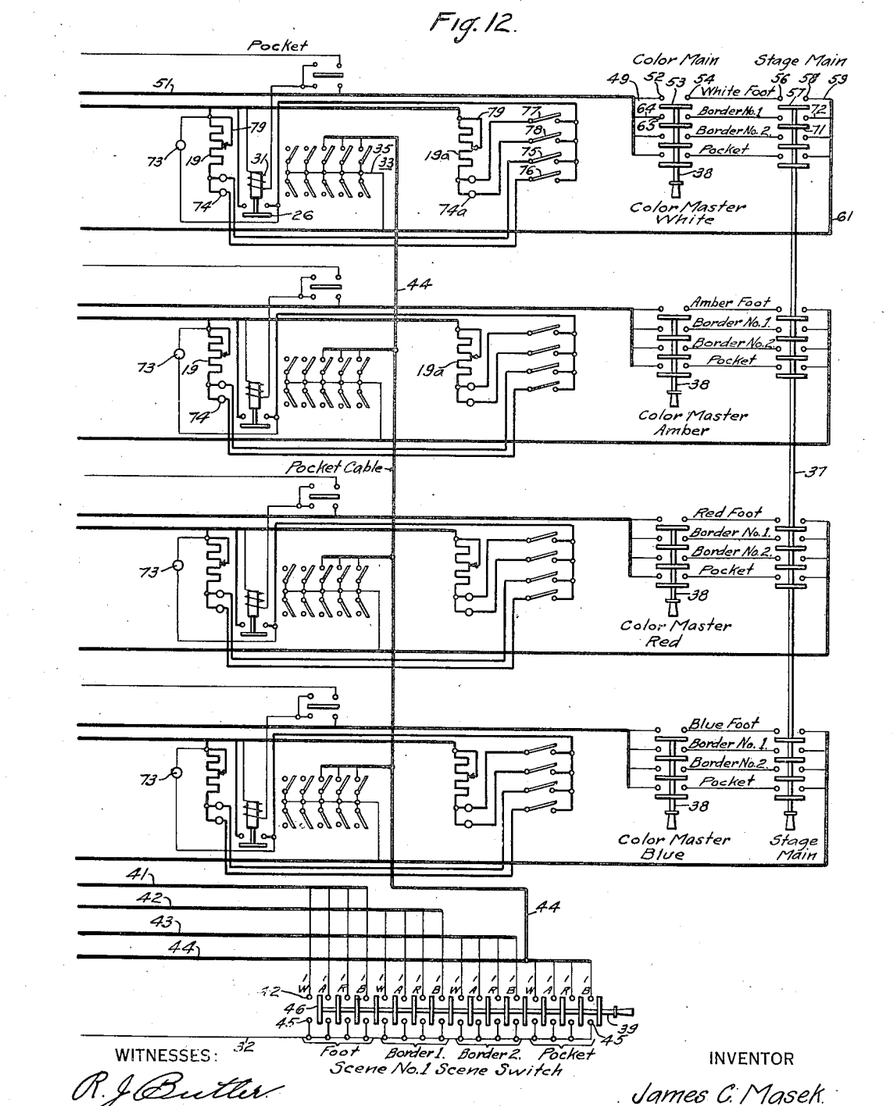

Referring to Figs. 11 and 12, the switchboard apparatus is illustrated as being connected to a three-wire feeding circuit 13 shown at the left end of the diagram and which comprises positive and negative buses 14 and 15 respectively and a neutral bus 16. In the present device provisions are made for four separate color circuits in each of four separate lighting systems designated as "foot" "border #1" "border #2" and "pocket". It will be understood that any number of systems may be ignored, the aforementioned being only for the purpose of illustration and no mention is made in the diagram to the lighting systems of the auditorium.

Each lighting system comprises four separate color load circuits, namely, white, amber, red and blue, it being understood that the color of each circuit is produced by incandescent light bulbs that produce light of the designated colors. The coloring may be effected by coloring the glass of the bulbs or by colored screens placed in front of the bulbs, the manner of coloring being immaterial to the invention.

As illustrated, the dimmers, lamps, contactor switches and scene-selector switches associated with the different color circuits of a system are grouped in superimposed relation in vertical rows, for instance, the foot light system is shown in the vertical row at the left end of the diagram.

For the purpose of illustration, the apparatus of the light circuit of the "foot" light system shown at the upper left hand corner of the diagram will be described as typical of each control unit for a circuit. It will be understood that for the purpose of reducing the number of conductors and for minimizing confusion of circuits, cables are illustrated which it will be understood contain all of the conductors leading thereto and thereout of. Each lighting circuit and control unit therefor independent of the main, color and scene switches comprises a plurality of lamps 17 connected in parallel in the lamp circuit 18. A dimmer 19 is connected in series with the lamps. The branches 21, 22 and 23 from the said conductors 14, 15 and 16, respectively, enter the cable 24 and the current from the branch 22 passes to the conductor 23 through the dimmer 19, lamp 17, circuit 18, switch contact 25, contactor switch 26, switch contact 27 and conductor 28. The contactor switch 26 is actuated by an electromagnet 29, having a coil 31 that is connected to the positive feed conductor 21 at one end and to the neutral bus 32 at the bottom of the diagram through conductors and switch mechanism that will be hereinafter referred to.

Each control unit of a lighting circuit includes a group 33 of pre-settable or scene selector switches numbered from one to ten as indicated in the diagram, each switch comprising a movable plate with a contact member 34 connected to a common conductor 35, the contact member or plate being adapted to engage a terminal 36. The switch is designed as illustrated to accommodate a pre-set of the lighting circuits for ten scenes and consequently each control unit is provided with 10 pre-settable switches as shown.

The circuit through each coil 31 of the contactor switches 26 is adapted to be connected to the neutral bus bar 32 through the medium of a main switch 37 shown at the extreme right hand of the diagram and the circuits through the contactor switches, coils 31 of all of the lighting circuits of the same color are established through a color master switch 38, there being a separate color master switch provided for the lighting circuits of each different color. The circuit current passing through the contactor coil 31 of any given contactor switch 26 must also pass through one of ten scene switches 39, three of which are shown at the bottom of the diagram for the purpose of illustration.

In operation, should it be desired that the white and blue foot lights be illuminated during scenes one and three of a performance and the amber and red foot lights be illuminated during scene two of the performance the number 1 and 3 pre-settable switch 34 are closed in the white and blue groups 33 of pre-settable switches and the number 2 switches of the pre-settable switches of the amber and red groups are closed as illustrated. The main switch 37 is closed and the white, amber, red and blue color master switches are closed. When the scene one scene-switch 39 is closed current will be established through the contactor coils 31 of the white and blue circuits and no current will flow through the amber and red circuits until the scene two scene-switch 39 is closed. During scene two the scene one and scene three scene-switches are open. When scene three scene-switch 39 is closed current will flow through the coils 31 of the white and blue circuit contactor switches 26 and cause white and blue illumination of the foot lights. During this time it will be understood that scene one and scene two scene-switches are open.

It will be noted that the conductors 1, 2 and 3 leading from the pre-settable switch contacts 36 of the white, amber, red and blue foot light circuits of the foot light system lead into a cable 41. It will be understood that all of the number one conductors from the switch groups 33 of the white, amber, red and blue circuits emerge from the foot cable 41 and are connected to switch contacts 42 of the scene one main switch shown at the lower right hand end of the diagram. The conductors being designated at that point by the legends 1W, 1A, 1R, 1B indicate that they are the conductors from number one pre-settable switches of the white, amber, red and blue foot light system.

The number two conductors of the said groups of the pre-settable switches lead into the cable 41 and upon emergence therefrom are connected to contacts 42 of the scene two scene-switch 39, the conductor being identified by the legends 2W, 2A, 2R, 2B, to distinguish the color of the circuit to which they are connected. The conductors 3 of the said group of pre-settable switches enter the foot cable 41 and upon emergence therefrom are connected to the contacts 42 of the scene three scene-switch 39 and are identified by the legends 3W, 3A, 3R and 3B, as shown in the case of the conductors 1 and 2.

As in the case of the conductors from the groups 33 of the pre-settable switches of the foot light system, the corresponding conductors 1, 2 and 3 to 10 of the "border #1" "border #2" and "pocket" systems lead to their respective scene-switches through similar cables 42, 43 and 44 respectively. It will be understood that all of the conductors number one from all of the groups 33 of pre-settable switches or all of the lighting systems lead to contacts 42 of the scene one scene switch 39 which is of the drum type illustrated in Figs. 8, 9 and 10. It will be noted that when a scene-switch is closed connection is made between the conductors associated with the contacts 42 and contacts 45 that are connected in common to the neutral bus bar 32.

The circuit betwen the magnet coil 31 of the contactor 26 of the white foot light circuit and the conductor 35 that is connected in common to the switch blades 34 of the pre-settable switches comprises a conductor 47, shunting switch 48, conductor 49 which enters a cable 51 and upon emergence therefrom is connected to a contact 52 of the white color master switch 38. The circuit is continued through the bridging switch 53 of the white color master switch 38 contact 54, conductor 55, contact 56 of the main switch 37, bridging switch 57 thereof contact 58, conductor 59, which enters the cable 61 and upon emergence therefrom is connected to the conductor 35. From this point on, current flows through any conductor 1, 2, 3 to 10 to its respective scene switch and thus to the neutral bus bar 32.

Current flows through the coil 31 of the contactor switch 26 of the white "border #1" circuit through a conductor 62 bridging switch 63, conductor 64 which enters the cable 51, and which upon emergence therefrom is connected to a contact 65 of the white color main switch 38. Current thus passes through bridging switch 66, contact 67, conductor 68, contact 69 of the main switch 37, bridging switch 71, conductor 72 which enters the cable 61 and upon emergence therefrom is connected to the common bus 35 of the pre-settable switches 33 of the white "border #1" circuit of the "border #1" system.

The white circuit of the "border #2" and "pocket" systems, it will be noted, are provided with shunting switches similar to those of the "foot" and "border #1" circuits and the coils 31 of the contactor switches 26 of those circuits and the circuits are completed to the buses 35 thereof through the bridging switch contacts of the white color main switch 38 and the main switch 37 as in the manner previously described.

The circuit through the pre-settable switches of the amber light circuits of the "foot" "border #1" "border #2" and "pocket" systems are established through the amber color master switch and the associated position of the main switch 37 in a similar manner and it is believed unnecessary to trace the circuits through the various systems in detail. This also applies to the red and blue circuits of the noted systems.

A pilot lamp 73 connected in parallel with the dimmer and lamp circuits is energized when the dimmer and lamps or the circuit are energized and serves to indicate whether the circuit is energized.

The "pocket" light circuits are similar to the other lighting circuits with the exception that two dimmers 19 and 19a are controlled through the pre-settable switches 33. The "pocket" light circuit comprises two groups of receptacles 74 and 74a associated with the dimmers 19 and 19a, respectively. The receptacles 74 are paralleled individually by switches 75 and 76 and the receptacle 74a is individually controlled by the switches 77 and 78.

The loads to be connected to the "pocket" receptacles 74 and 74a usually consist of portable spot lights that may be disposed where desired and it may be desirable to dim the lamps of one spot light connected to a circuit while the intensity of the lighting of another spot light is being increased. It is therefore desirable to have individual dimmer control of at least two spot lights connected to the same circuit. The switches 75 and 78 may be operated to energize the spot lights as desired.

The movable contacts 79 of all of the dimmers 19 are arranged to be actuated individually or in groups through the medium of gearing or general drives, and the arrangement of the operating mechanism is such that the dimmer actuating mechanism may be preset for a scene to be enacted. Clutches are provided to enable the disconnection of certain dimmers from the master drive mechanism to cause them to substantially remain as set while other dimmer contacts are moved either to increase the resistance in the circuit or to decrease it.

Figure 4:
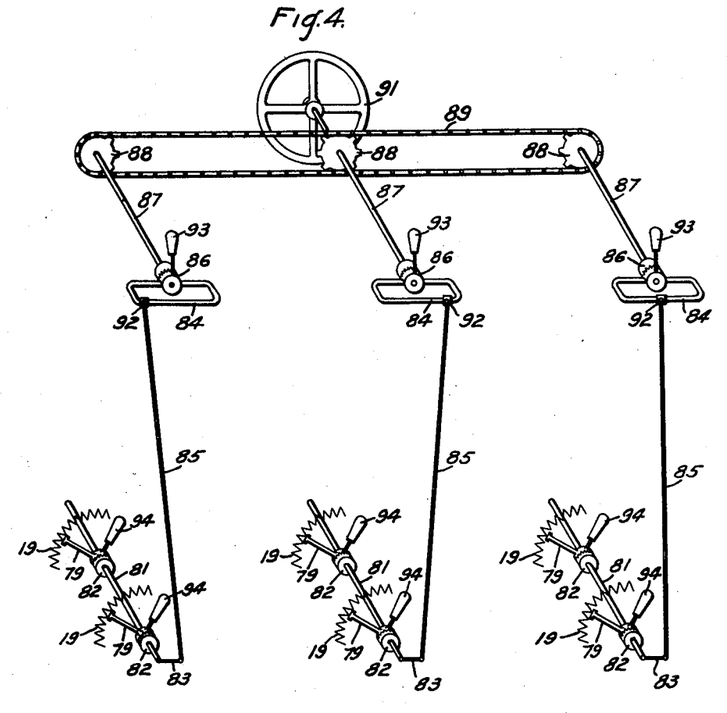
Fig. 4 is a diagrammatic perspective view illustrating a portion of the dimmer apparatus of the switchboard.

A form of dimmer actuating mechanism is illustrated diagrammatically in Fig. 4. It will be noted that the dimmers are arranged in groups on the plurality of operating shafts 81 and that the movable contacts 79 are releasably connected to the shafts 81 by the clutches 82 that may be engaged or disengaged as desired to produce the contemplated lighting effect. The dimmer shafts 81 are actuated through cranks 83 that are pivotally connected to rocking cranks 84 through the medium of connecting rods 85. The cranks 84 are connected to clutches 86 mounted upon driving shafts 87 that are simultaneously rotated by gears 88 through the medium of chair 89 that is driven by the gear 88 that is connected to the dimmer drive wheel 91 that may be either motor driven or manually operated. The upper end of the connecting rods 85 are pivoted to sleeves 92 which may be adjusted in any position along the rocking arms 84.

As shown in Fig. 4, the sleeve 92 of the left hand connecting rod 85 is located at the left hand end of the rocking arm 84, the sleeve 92 of the central connecting rod 85 is located at the right hand end over its respective rocking arm 84 and the sleeve 92 of the right hand connecting rod 85 is located at the center of the rocking arm 84. When the connecting rods are so connected to their respective rocking arms it will be seen that counter rotation of the master operating wheel 91 in the direction of the arrow will cause similar rotation of the rocking arms 84. The result of the movement of the dimmers is as follows: the left hand contact arms 79 of the dimmers at the left hand of the diagram will be turned in a clockwise direction, the contact arms 79 of the central dimmers will be moved in a counter clockwise direction and since the sleeve 92 of the right hand connecting rod 85 is disposed co-incident with the axis of the shaft 87, no movement will be imparted to the right hand dimmers.

The sleeve 92 may be adjusted to any position between extreme limitations of movement thereof upon the rocking arms 84 to obtain variations in the degree of movement of the contact arms of the dimmers with a given movement of the master dimmer wheel. For instance a predetermined movement of the master dimmer wheel may cause full travel of the contact arms 79 of one set of dimmers and a very slight movement of dimmers associated with another shaft depending upon the position of the sleeve 92 on the rocking arm 84. By reason of this arrangement of dimmer actuating mechanism, the dimmers may be simultaneously moved at opposite directions and different distances, enabling the operator to obtain a great variety of lighting effects. A grouping of dimmers connected to a single shaft 81 may be manually operated independently of other groups of dimmers by means of the operating handles 93 and each individual dimmer may be manually actuated independently of the others by the operating handles 94. In each instance, it is necessary to disengage the clutches 86 and 82 respectively to provide independent operation of the groups of dimmers or individual dimmers of a group.

Figure 1:
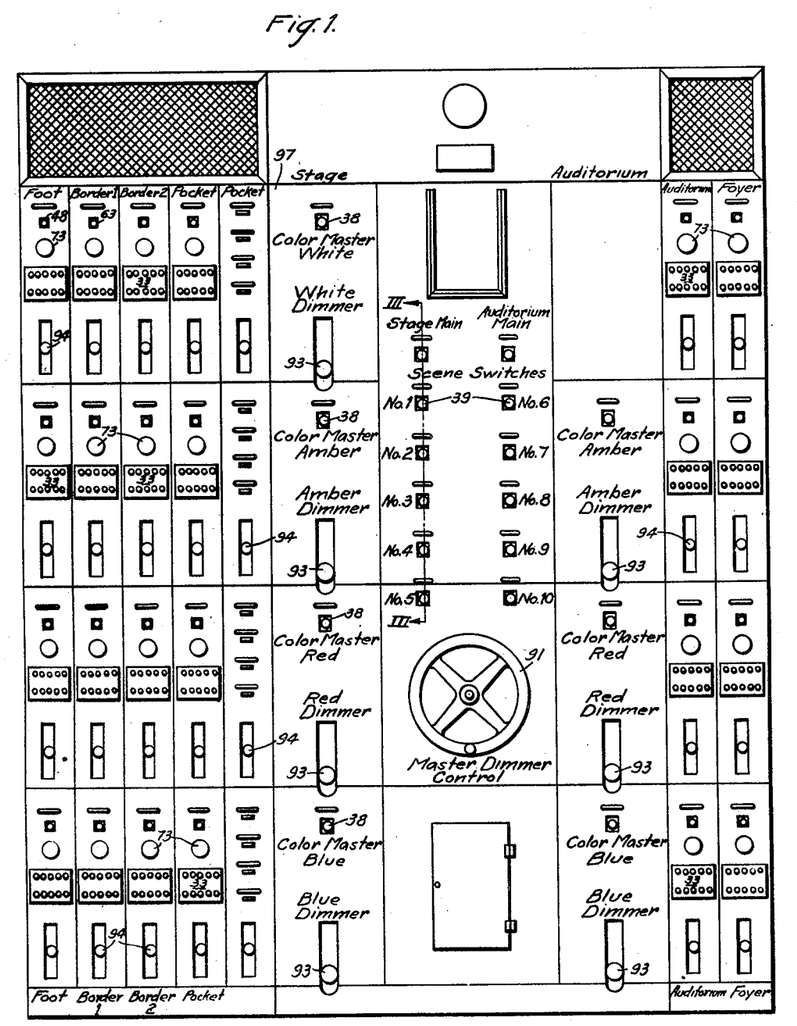
Figure 1 is a front elevation of a theater switchboard embodying features of my invention.
Figure 2:
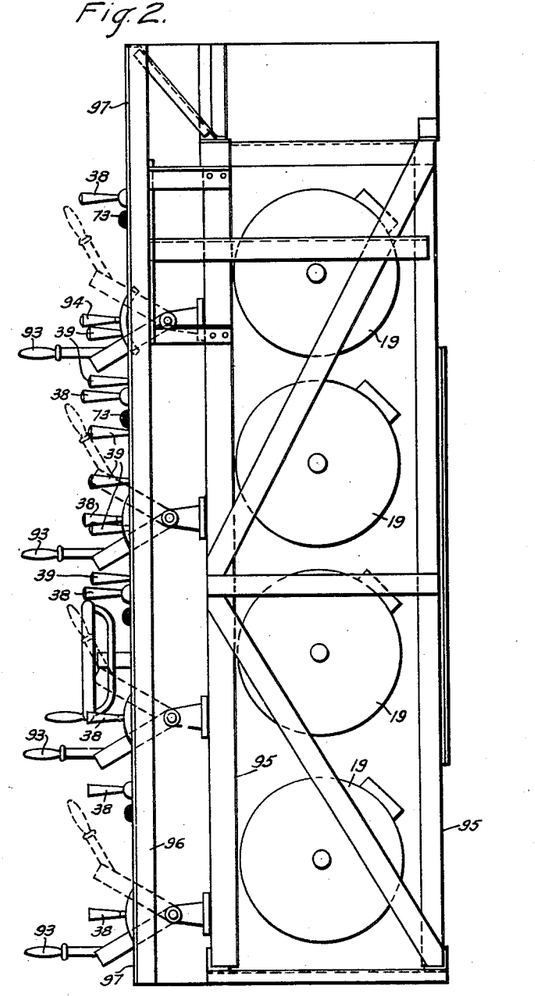
Fig. 2 is an end elevation of the switchboard shown in Fig. 1.

Fig. 1 illustrates a front elevation of a theater switchboard containing the apparatus and wiring connections above described, and Fig. 2 is an end elevation of the theater switchboard shown in Fig. 1. The switchboard structure comprises a steel frame work 95 upon which the dimmers 19 are mounted. Second, steel frame 96 is disposed in front of the frame 95 which serves to support the switch operating handles and the pre-settable switch groups 33. It will be noted that the front of the frame 96 is provided with a plurality of cover plates 97 having openings through which the operating handles project forwardly to render them accessible from the front of the board which may be deemed a dead-front switchboard for the reason that no live conductors or parts of the apparatus are exposed.

Fig. 1 is self explanatory in view of the fact that the various operating handles and pilot lamps are identified by numerals corresponding to those identifying parts of the apparatus previously referred to. It will be noted that the "foot" "border #1" "border #2" and spot light circuit apparatus representing the circuits used on the stage are disposed at the left side of the board and the auditorium circuits are disposed at the right side of the board with the scene switches and dimmer operating handles disposed between them in the central part of the board. The master dimmers and scene control switches are grouped in such manner that an operator standing at the center of the board can manipulate them without moving from one position. The advantage of this feature is apparent when it is taken into consideration that the switchboard may contain fifty or more circuits, only six of which are illustrated in the Figure.

Figure 5:
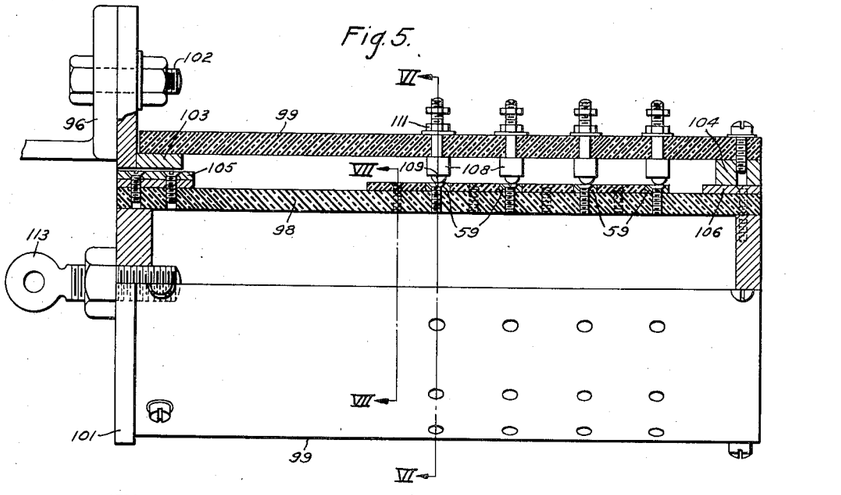
Fig. 5 is an elevational view partly in section of a typical color master switch, house or stage main switch.
Figure 6:
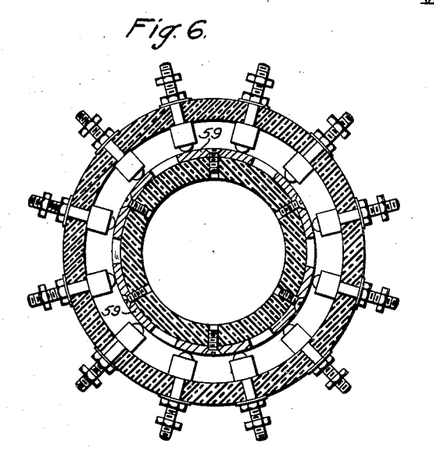
Fig. 6 is a transverse section through the drum switch taken on the line VI—VI of the Fig. 5.
Figure 7:
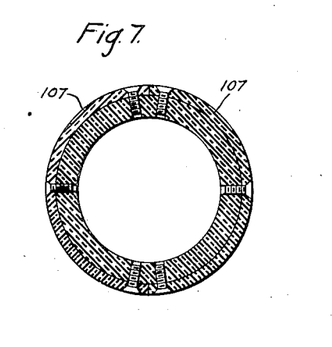
Fig. 7 is a transverse section through the inner drum taken on the line VII—VII of Fig. 5.

Referring to Figs. 3 to 10 the drum switches constituting the main switch, main color master and scene switches are illustrated in Figs. 5, 6 and 7, the difference between the switches residing only in the number of contact members thereon. Each switch comprises an inner drum 98 and an outer drum 99 made of insulating material, the outer drum being secured to end plate 101 which is attached to the frame 96 by bolts 102. The ends of the drum 99 are provided with annular bearing collars 103 and 104 which serve as bearings for the inner drum 98 which is provided with annular collars 105 and 106. The inner drum 98 is adapted to move longitudinally or axially within the outer drum a sufficient distance to move the conducting bands on the inner drum out of engagement with contact fingers on the outer drum to interrupt all of the circuits connected to the switch.

The inner drum of the main switch which is similar to the color master switch, is provided with a plurality of bridging switch plates 59 that are insulated from one another longitudinally on the drum by insulating bands 107, as shown in Fig. 7, and are formed in two positions and completely surround the drum. The bridging switch plates 59 are adapted to be engaged by contact fingers 108 disposed therein and pressed into engagement with the surface of the inner drum by means of a helical spring, (not shown) within the finger 108. The contact fingers 108 project through the outer drum 99 and are secured thereto by means of nuts 111, the threaded ends of the contact fingers forming terminals for the fingers, and to which the conductors such as 55 and 59 are attached.

When the inner drum 29 is thrown toward the left a slight distance, the bridging switch plates are moved out of contact with the bands of the contact fingers and consequently the circuit through the control circuit is interrupted.

Figure 3:
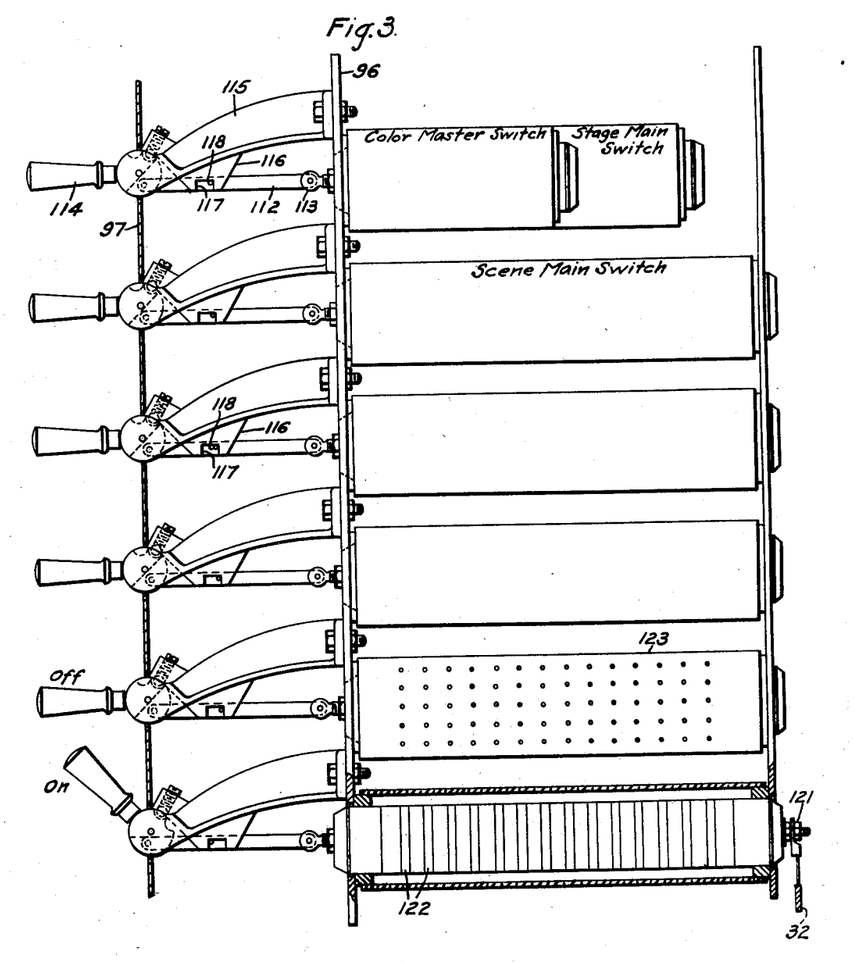
Fig. 3 is a sectional view through a portion of the switchboard taken on the line III—III of Fig. 1 illustrating the drum switches in elevation and one of them in longitudinal section.
Figure 8:
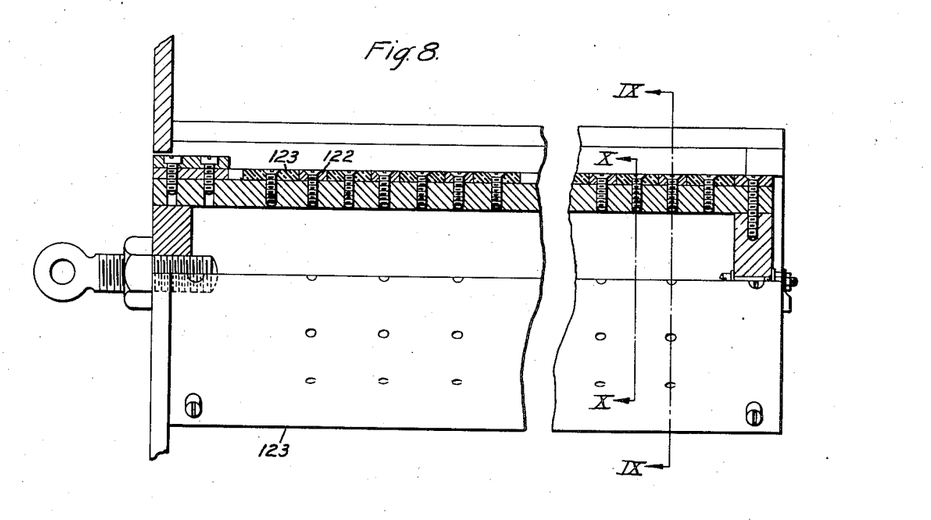
Fig. 8 is an elevational view partially in section illustrating a scene main switch.
Figure 9:
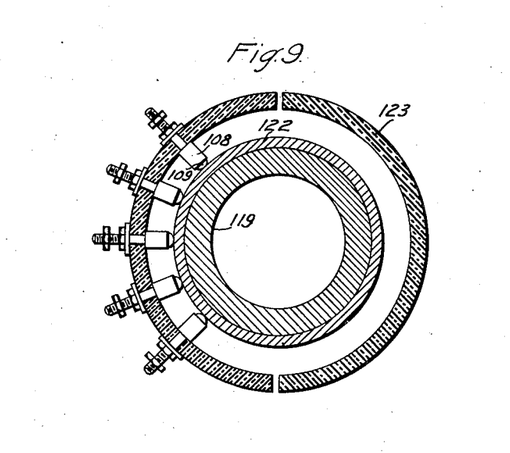
Fig. 9 is a transverse section through a switch taken on the line IX—IX of Fig. 8.
Figure 10:
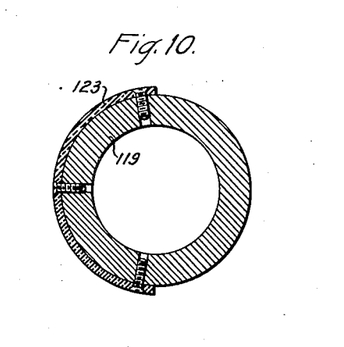
Fig. 10 is a transverse section through the inner drum of the drum switch taken on the line X—X of Fig. 9, and Figs. 11 and 12 combine and constitute a wiring diagram illustrating the switches, dimmers and the wiring connections thereto.

The inner drums are actuated by means of a link 112 that are pivotally connected to an eyelet 113 mounted on the end plate 101 of the outer drum, the outer end of the links 112 being pivotally connected to operating handles 114 and are pivotally supported to brackets 115 attached to the frame 96. The brackets 115 are provided with webs 116 having notches 117 for receiving pins 118 on the links 112, the pins serving to limit the longitudinal movement of the inner switch drum. As illustrated in Fig. 3, all of the operating handles are in the off position except the lower-most handle and the switch which is shown in the on position with the inner drum shown in its outer-most position. The lower-most drum illustrated in Fig. 3, however, is a scene switch drum, which differs from the drum switches previously described only in the difference in the form of contact plates, and in the fact that the inner drum 119 is made of metal and is connected to the neutral or ground bus 32, through the terminal 121. The contact bands 122 completely surround the drum 119 and are spaced apart by insulating bands 123 as shown in Figs. 8, 9 and 10, contact fingers 108 having contact bails 109 similar to the contact fingers of the main switches, and color master switches are mounted in the outer sleeve 123, and the conductors such as 1W, 1A, 1R, 1B, of the "foot" "border #1", "border #2", and "pocket" systems are attached thereto. When the switch is moved longitudinally a short distance all of the contact fingers 108 engage the bands on the contact bands on the drum 119 which connects all of the said conductors to the neutral bus bar 32.

By reason of the use of drum switches the space required for each switch is reduced to a minimum and consequently the overall dimensions of the switchboard are relatively small in view of the number of separate circuits controlled.

As previously stated, the lighting circuits for all of the lighting circuits may be present in advance for 10 scenes, the lighting being changed for each scene by successively opening and closing the various scene switches. By reason of the presence of color master switches, a number of color combinations may be produced without necessitating rearrangement of the pre-settable switches and by reason of the flexible control of the dimmer apparatus any desired lighting effect may be produced by pre-setting the dimmers between each scene.

While I have illustrated but one embodiment of my invention, it will be apparent to those skilled in the art that various changes, modifications, substitutions, additions and omissions may be made in the apparatus illustrated without departing from the spirit and scope of my invention as set forth in the appended claims.

I claim as my invention:

1. A theater lighting control system comprising a plurality of load circuits and a feed circuit, a group of pre-settable switches for each load circuit, each group having a separate switch for each separate scene, a scene switch for each scene connected in common to a corresponding pre-settable switch of each group, a main switch for concurrently controlling the circuits through all of the pre-settable switches and a separately operable switch for each group for concurrently controlling the circuit through all of the pre-settable switches of its respective group.

2. A theater lighting control system comprising a plurality of load circuits, and a feed circuit, a group of pre-settable independently operable switches for each load circuit, each group having a separate switch for each separate scene, a scene switch for each scene connected in common to a corresponding pre-settable switch of each group through separate conductors, and a main switch for concurrently controlling the circuits through all of the pre-settable switches.

3. A theater lighting control system comprising a plurality of load circuits, each having lamps of a different color, and a feed circuit, a group of pre-settable switches for each load circuit, each group having a separate switch for each separate scene, a scene switch for each scene connected in common to a corresponding pre-settable switch of each group. a main switch for concurrently controlling the circuits through all of the pre-settable switches and a separately operable switch for each group for concurrently controlling the circuit through all of the pre-settable switches of its respective group.

4. A theater lighting control system comprising a plurality of groups of load circuits and a feed circuit, a group of pre-settable switches for each load circuit, each group having a separate switch for each separate scene, a scene switch for each scene connected in common to a corresponding pre-settable switch of each group, and a pair of separately operable series connected switches, each for concurrently controlling the circuits through all of the said pre-settable switches of one group of load circuits, one of the said switches also controlling the circuits through the pre-settable switches of all of the groups of load circuits.

In testimony whereof, I have hereunto subscribed my name this 27th day of May, 1927.

JAMES C. MASEK.